April 2, 1957 R. E. RISLEY 2,787,051
METHOD OF INSTALLING FITTINGS UPON SUBMERGED PIPE
Filed Sept. 26, 1952 4 Sheets-Sheet 1

INVENTOR.
ROGER E. RISLEY
BY
ATTORNEY

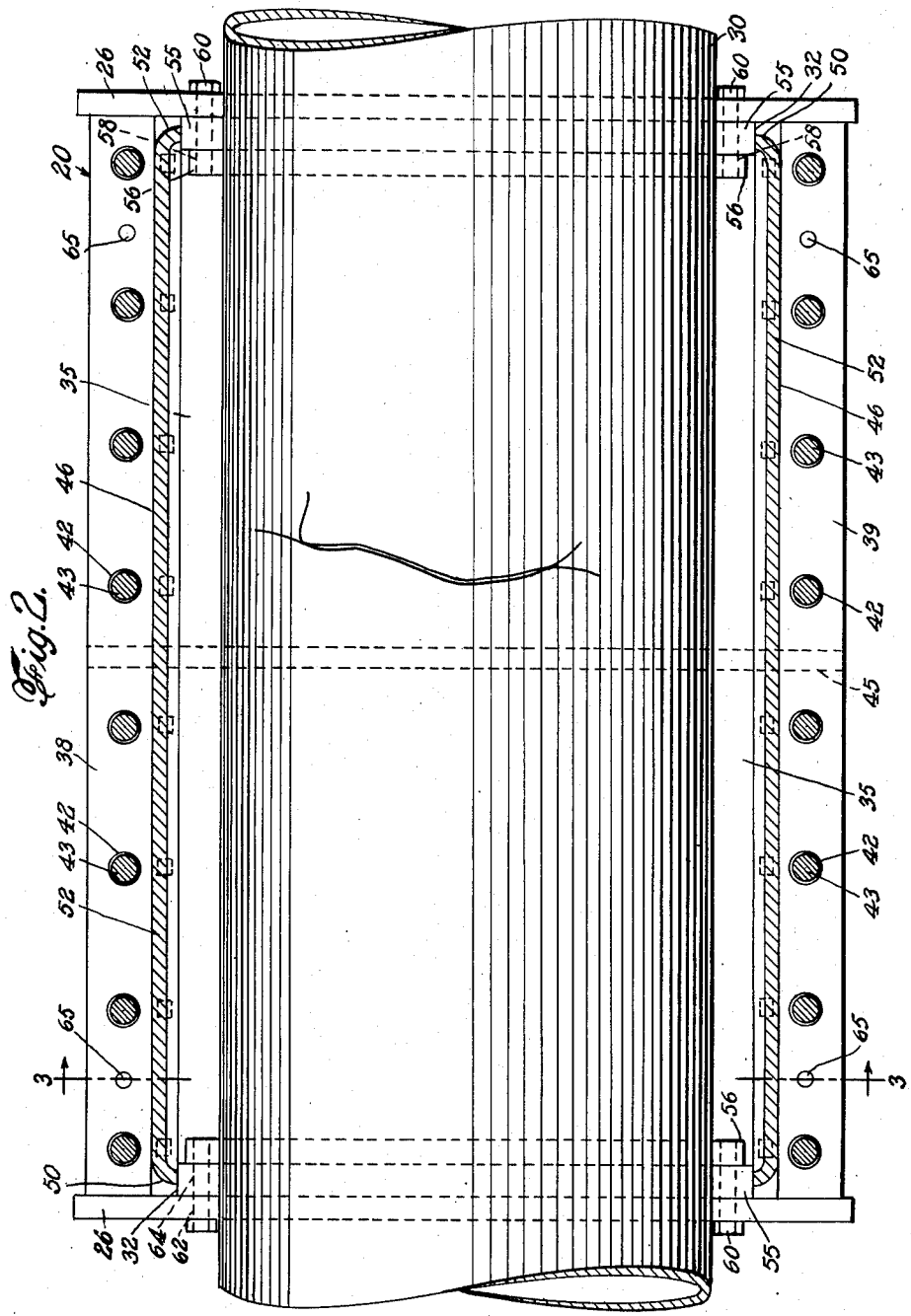

April 2, 1957 R. E. RISLEY 2,787,051
METHOD OF INSTALLING FITTINGS UPON SUBMERGED PIPE
Filed Sept. 26, 1952 4 Sheets-Sheet 3
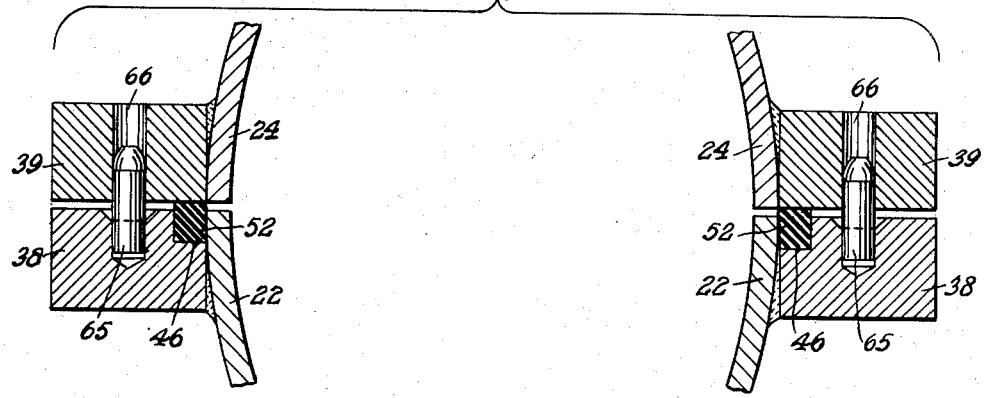
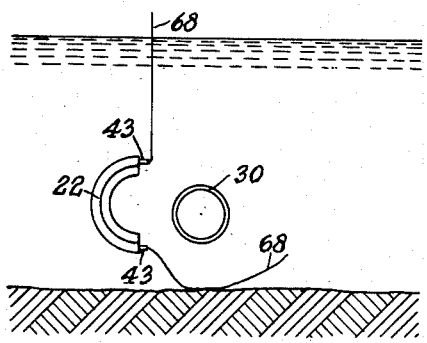
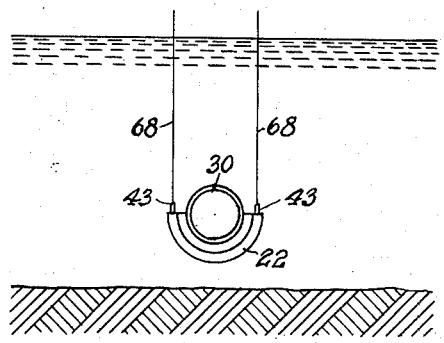
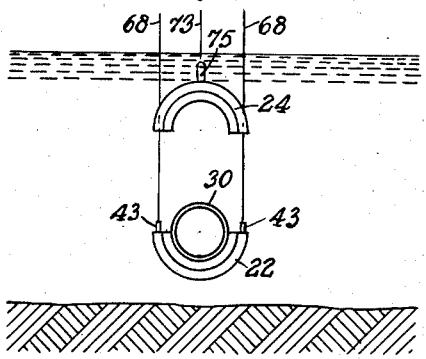
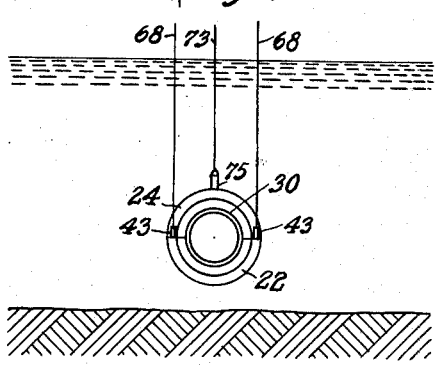
INVENTOR.
ROGER E. RISLEY
BY
ATTORNEY April 2, 1957
R. E. RISLEY
2,787,051
METHOD OF INSTALLING FITTINGS UPON SUBMERGED PIPE
Filed Sept. 26, 1952
4 Sheets-Sheet 4
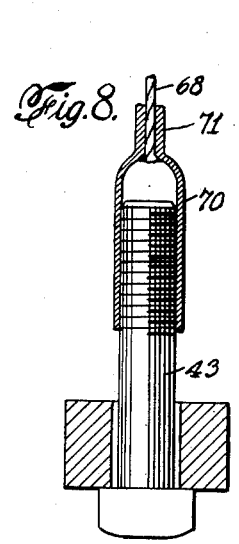
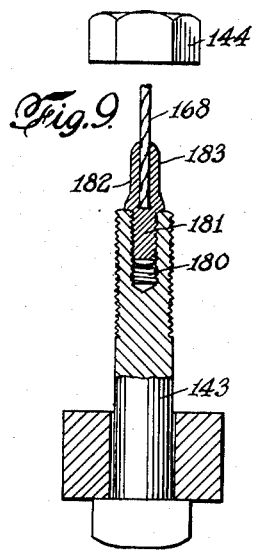
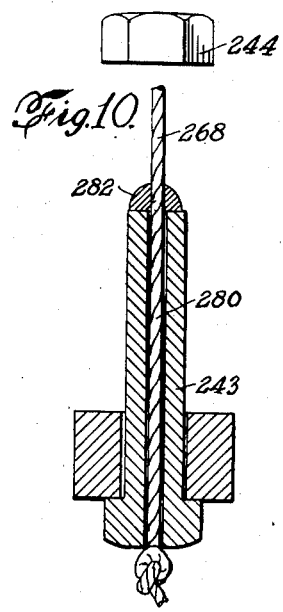
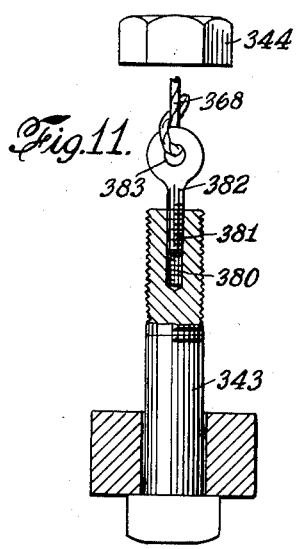
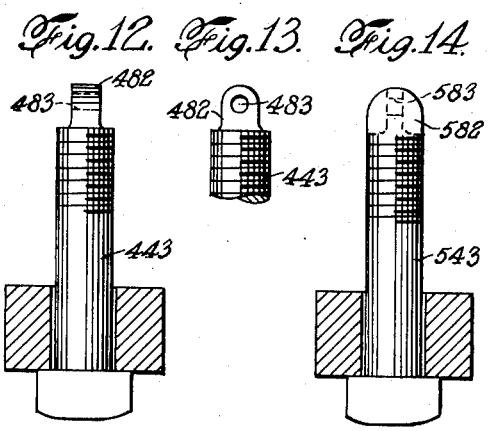
INVENTOR.
ROGER E. RISLEY
BY
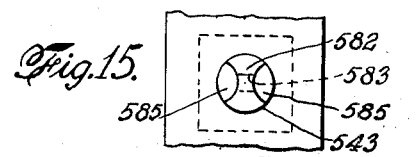
ATTORNEY

United States Patent Office 2,787,051
Patented Apr. 2, 1957

2,787,051

METHOD OF INSTALLING FITTINGS UPON SUBMERGED PIPE

Roger E. Risley, Bradford, Pa., assignor to Dresser Industries, Inc., a corporation of Delaware Application September 26, 1952, Serial No. 311,561

6 Claims. (Cl. 29—401)

This invention relates to a method of installing pipe couplings and like pipe fittings under water to enclose portions of submerged pipe lines.

Pipe lines for the long distance transmission of oil, water, gas and like fluids are customarily formed from a plurality of sections of steel pipe, which are interconnected in fluid-tight relationship by coupling elements. These coupling elements are generally of a type which not only provides the desired fluid-tight seal between the pipe sections but also simultaneously provides a sufficiently flexible joint to accommodate the expansion and contraction to which the pipe line is subjected under the conditions of service. Flexible couplings commonly in use for this purpose consist of sleeves or "middle rings," which are slipped over the ends of the adjacent pipe sections, and "followers," which are slipped over the pipe sections on each side of the middle ring and are then drawn against the ends of the middle ring by means of bolts. Suitable gaskets placed at the ends of the middle rings are compressed by the action of the followers to provide the necessary fluid-tight seal. Long distance pipe lines, however, pass over various types of terrain and in many cases when, for example, bridges are not available for supporting the pipe line across a river, lake or other body of water, it is necessary to lay the pipe line on the bed of the river or lake across which the pipe must pass. Because of geological conditions or the location of the right of way for the pipe line it is often not possible to skirt the body of water and thus to avoid the necessity of laying the pipe line through it. Many of these bodies of water are relatively deep and the stretch of water through which the pipe line must be laid is substantially great. In most cases, the pipe line must be laid by the progressive coupling of the pipe sections on the bed of the body of water, and it is not generally feasible to couple the pipe sections above the surface and then to lower them to the bed. The coupling of the pipe line sections on the river or lake bed with conventional couplings is very difficult, and in some cases almost impossible, because of the physical hazards and obstructions. It is necessary to use divers for this purpose and when the river or lake bottom is very silty, the least movement of the diver stirs up the silt and destroys visibility to such an extent that the diver must work entirely by touch. This makes the task of coupling the pipe sections exceedingly difficult and time-consuming and great skill is required on the part of the diver to insure proper installation of the coupling. Since divers are highly-skilled and high-paid workers, such operations greatly add to the cost of the laying of the pipe line.

Various proposals have been made for coupling structures adapted to simplify the problem of under-water pipe line installation, but they have not been entirely satisfactory for one reason or another. They have either been of a complicated and expensive structure, or they have been difficult to align properly on the pipe, or they have suffered from other disadvantages and drawbacks which have limited their general utility.

Under-water pipe lines occasionally develop leaks due to damage by contact with some external object, or due to corrosion or other deleterious action. In order to prevent loss of the fluid being transmitted through the pipe line or contamination of this fluid with the water through which the pipe line passes, it is necessary to repair the pipe line as rapidly as possible, and without taking the line out of service. Replacement of the damaged pipe line section would require the shutting off of the flow of fluid and would require the taking of the line out of service for a prolonged period of time while the necessary replacement could be made. This might have serious consequences and at best is a complicated and expensive operation. It is, therefore, customary to apply an external repair device around the damaged portion of the pipe line. Like couplings, however, such devices are difficult to install underwater and the repair of under-water damage to pipe lines presents, therefore, serious problems comparable to those involved in initially coupling the under-water pipe sections.

It is an object of the invention to provide an improved method of coupling pipe lines lying on the beds of lakes, rivers and other bodies of water.

It is a further object of the invention to provide an improved method for repairing such pipe lines.

In accordance with the invention, there is provided an interchangeable pipe coupling and pipe repair device comprising a tubular sleeve formed from two semi-cylindrical segments having cooperating means for fluid-tight inter-engagement. The sleeve segments are provided with means for permitting their automatic alignment and with means for facilitating lowering of the sleeve segments from the surface to the point of application to the pipe line on the river or lake bottom. The means for aligning the sleeve segments include pins and cooperating recesses which are engaged by the pins to hold the segments in the desired predetermined position to permit rapid, fluid-tight inter-connection of the segments. In accordance with the invention, the means for facilitating the lowering and positioning of the segments include bolts which are adapted to be connected to the lowering line means. In a preferred embodiment of the invention, the bolts are constructed and arranged to facilitate automatic under-water guiding of the nuts to be engaged with the bolts.

In accordance with the installation method of the invention, one of the segments is lowered into position by lines attached to the bolts on each axial side of the segment and the second sleeve segment is then caused to be guided by the same lines into engagement with the first segment, thereby insuring proper coperative positioning of the segments and minimizing the time required for installation.

Other objects and features of the invention will be readily apparent from the following detailed description thereof and from the accompanying drawings, wherein:

Fig. 2 is a sectional view taken approximately along the line 2—2 of Fig. 1;

Fig. 3 is a sectional view of a detail of the coupling of Figs. 1 and 2, taken approximately along the line 3—3 of Fig. 2;

Fig. 4 shows the first step of the installation of the coupling shown in Figs. 1 and 2;

Fig. 5 shows the second step of installation;

Fig. 6 shows the next installation step and illustrates the guided lowering of the upper segment;

Fig. 7 shows the completed installation just before removal of the guide lines;

Fig. 8 is an enlarged sectional view of the bolt and cable arrangement shown in Figs. 1 and 2;

Fig. 9 is a similar view of a bolt and cable construction in accordance with the invention;

Fig. 10 is a sectional view of a modified bolt construction;

Fig. 11 is an elevational view, partly in section, of another bolt embodying features of the invention;

Fig. 12 is a side elevational view of another form of bolt in accordance with the invention;

Fig. 13 is a fragmentary view of the upper end of the bolt shown in Fig. 12 as seen from the left of Fig. 12;

Fig. 14 is a side elevational view of another form of bolt; and

Fig. 15 is a top plan view of the bolt illustrated in Fig. 14.

Figure 1:
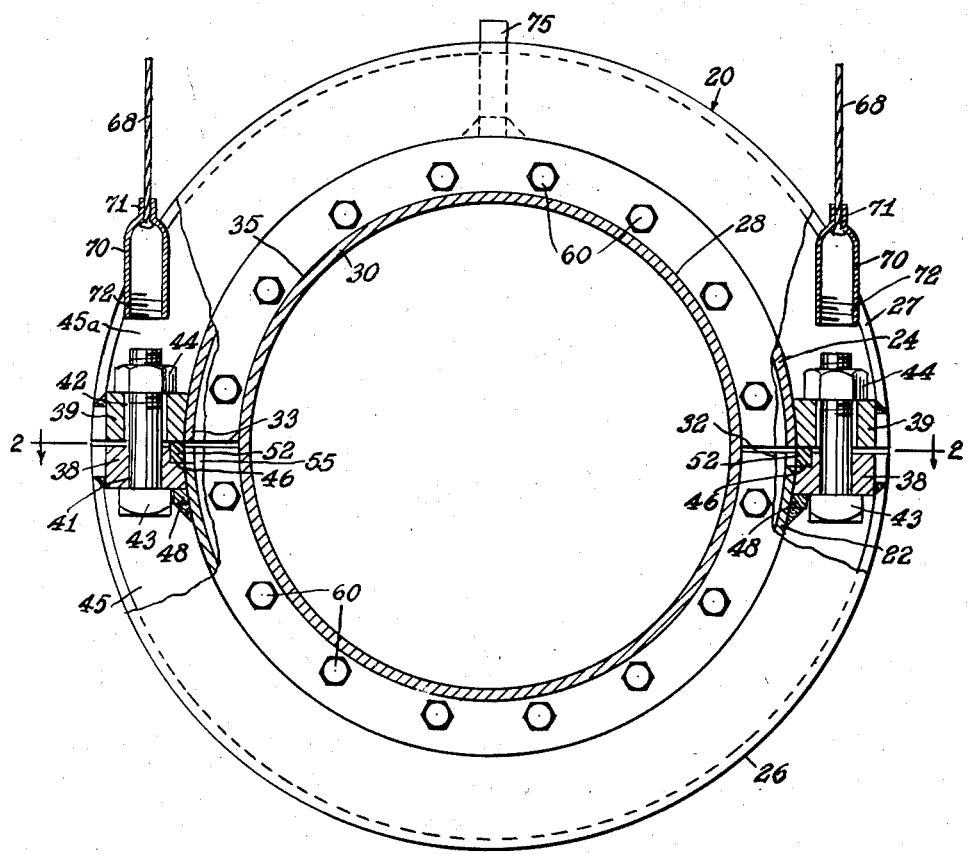
Fig. 1 is an end elevational view, partly in section to show details of construction, of an under-water pipe fitting adapted for coupling or repairing pipe lines and embodying features of the invention.

Referring to the drawings, and more particularly to Figs. 1 and 2, the split tubular sleeve illustrated is designated generally by the reference numeral 20 and is formed from two semi-cylindrical sleeve segments 22 and 24. The ends of the sleeve segments 22 and 24 are formed with radially-extending walls 26 and 27, respectively, the inner edges of the walls 26 and 27 cooperating to form circular pipe apertures 28 through which is passed the pipe 30 upon which the split sleeve, as illustrated, is mounted. The radially inner portions of the end walls 26 and 27 define, with the adjacent inner surfaces of the sleeve bodies, gasket recesses 32 and 33, respectively, which are adapted to receive suitable packing members or gaskets for effecting fluid-tight engagement with the outer surface of the pipe 30, as will be described hereinbelow.

The sleeve segments 22 and 24 thus cooperate to define an interior chamber 35 of sufficient diameter to enclose the pipe 30, and, in the event the sleeve 20 is to be employed as a repair device for a pipe line in which the damaged portion of the line is at or adjacent the coupling, the chamber 35 may advantageously be of sufficient size to enclose a conventional pipe coupling (not shown) by means of which two adjacent sections of pipe are connected. The particular dimensions of the chamber 35, however, do not affect the construction of split sleeve 20 insofar as it relates to the present invention, which is primarily concerned with the relationship of the sleeve to the sleeve bolts exteriorly of the chamber 35 and with the method of installing the sleeve.

The longitudinal edges of sleeve segments 22 and 24 are formed with complementary joining means adapted to form a fluid-tight longitudinal joint for the sleeve 20 and comprise flanges or "side bars" 38 and 39, respectively. Side bars 38 and 39 are secured, as by welding or in any other convenient manner, to the longitudinal edges of sleeve segments 22 and 24, respectively, and at their ends to the end walls 26 and 27. The side bars 38 and 39 extend from one end wall to the other of the respective sleeve segments and are formed with a plurality of axially-spaced registering bolt holes 41 and 42, respectively, adapted to receive bolts 43 for drawing the segments together about the pipe 30 by cooperation with nuts 44. Reinforcing ribs 45 and 45a, extending circumferentially over the outer surface of the segments 22 and 24, respectively, and secured thereto as by welding, reinforce side bars 38 and 39 and give them increased strength to resist undesired bending when they are bolted together. On the lower surface of each of the side bars 38, and adjacent each of the bolt holes 41, are secured stop members 48. Stop members 48 are of a size which permits the heads of the bolts 43 to lie against side bars 38 but effectively prevents rotation of the heads when the nuts 44 are tightened.

A fluid-tight seal between the opposed side bars of sleeve segments 22 and 24 is effected by means of gasket strips which are compressed to the required extent when the segments are bolted together by means of bolts 43 and nuts 44 during assembly of the coupling around the pipe 30. For this purpose the side bars 38 are each formed with a longitudinally-extending groove 46 disposed adjacent the juncture line of the side bars 38 with the body of the sleeve segment 22. The ends of the grooves 46 are turned inwardly of the sleeve and communicate with recesses 50 formed in the side wall of the segment 22 and connecting the grooves 46 with the previously-mentioned gasket recesses 32 and 33. The grooves 46 may be of any convenient form longitudinally and they will naturally follow to a certain extent the configuration of chamber 35. The grooves 46 are preferably of substantially uniform width throughout their length and throughout their depth and are preferably of square cross-section, although this is not essential.

The grooves 46 are adapted to receive a longitudinal side packing or gasket 52 of a width substantially equal to that of the grooves 46 and of a thickness somewhat greater than the depth of these grooves so that when the side packing 52 is inserted in the grooves, a considerable portion of it will extend upwardly above the faces of side bars 38. Thus, when the two sleeve segments 22 and 24 are drawn together by the action of bolts 43, the gasket strip 52 is compressed and is displaced laterally to provide a secure, fluid-tight seal.

A fluid-tight seal is in like manner provided at the ends of sleeve 20 by means of packing members or gaskets 55 which are adapted to be compressed in gasket recesses 32 and 33, and to be displaced radially-inwardly and outwardly into sealing relationship with the outer surface of pipe 30 and side packings 52. While gaskets 55 may be of any convenient form, they are suitably cut from a straight strip or molded to a semi-circular form with the meeting ends formed to effect a butt joint. Thus, the ends of the gaskets 55 in the gasket recesses of segments 22 and 24 are adapted to abut when the segments are assembled around the pipe 30 and to be pressed into sealing relationship.

Gaskets 55 and side packing strips 52 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined.

Gaskets 55 are compressed into sealing relationship with pipe 30 by means of clamping rings or followers 56. The followers 56 are formed in two sections with abutting ends. Each follower section is provided with a series of circumferentially-spaced threaded apertures 58 which are adapted to receive bolts 60 in threaded engagement. The radial end walls of the sleeve segments 22 and 24 are provided with apertures 62 and the gaskets 55 are similarly provided with apertures 64. The apertures 62 and 64 are adapted to register with the threaded apertures 58 in the follower sections for reception of the bolts 60. To compress the gaskets 55, bolts 60 are tightened, resulting in the axial movement of the follower sections toward the radial end walls of the sleeve segments. Axial compression of the gaskets 55 results in radial expansion of these members into sealing engagement with one another, with the side bar packing strips 52, and with the surface of the pipe 30.

In accordance with the invention the sleeve segments 22 and 24 are adapted to be lowered into the water separately and to be assembled around the submerged pipe 30 with maximum speed and efficiency. It is a feature of the invention that the split sleeve 20 is provided with means for facilitating its underwater assembly. Referring again to Figs. 1 and 2, the side bars 38 are provided with pins 65 secured, as by welding, in corresponding recesses in the faces of side bars, and side bars 39 are formed with apertures 66 adapted to receive the pins 65. The pins and apertures are arranged in such manner that they will interengage when the two sleeve segments are in proper aligned position and they thus provide a means for automatically aligning the segments under water.

The sleeve segments are adapted to be lowered into submerged position by means of ropes or cables removably secured to the side bar bolts and for this purpose the bolts are provided with rope or cable securing means of a construction which adapts them for such use. As shown in Figs. 1, 2 and 8, the ropes or cables 68 are removably secured to the bolts 43 by means of internally-threaded bolt sockets 70 having a narrow tubular portion 71 in which the end of cable 68 is firmly gripped and a thin-walled threaded portion 72 which threadedly engages the bolts.

According to the present invention, the sleeve 20 may be rapidly and efficiently installed around submerged pipe section 30 by the steps illustrated in Figs. 4–8. As shown in Fig. 4, ropes 68 are secured to the bolt sockets 70 which are threadedly engaged with the bolts 43 of sleeve segment 22 and this segment is lowered to the bottom of the body of water in which pipe 30 is submerged. The sleeve segment is lowered in a vertical position as illustrated with the ropes on one side hanging freely. In lowering the sleeve segment 22 into the water at least two, and preferably all of the bolts 43 on each side of the sleeve are engaged by bolt-sockets 70 carrying cables 68, the sleeve being lowered as shown in Fig. 4. To facilitate the pulling of the cables on the lower side of the sleeve under the pipe, these cables may be temporarily tied together. The diver who is making the installation pulls the free ropes 68 under the pipe 30 and returns them to the surface, the sleeve 22 then being pulled into the position shown in Fig. 5. The side bar bolt apertures 41 of sleeve segment 24 are then threaded over ropes 68 and a lowering rope 73 is secured to a central anchor loop 75 provided on the body of sleeve segment 24. The ropes 68 are held taut, and the segment 24 is lowered into position over segment 22, the ropes 68 automatically guiding the segment 24 into position. The sleeve segment 24 is guided over the bolt sockets 70 into engagement with bolts 43. When the pins 65 interengage with the apertures 66 in the side bars 38, the diver knows that the two sleeve segments are in position for bolting. Before being lowered into the water, the sleeve segments 22 and 24 are fitted with end-wall gaskets 55 and with followers 56, these two elements being held in loose position by means of the bolts 60 and the side bars 38 of sleeve segment 22 are provided with side pack gaskets 52 which are firmly positioned in grooves 46. When the sleeve segments have been brought into position as above described, therefore, it is merely necessary for the diver making the installation to remove each bolt socket, to apply a nut 44 to each of the side bar bolts 43, and to tighten the nuts. By reason of the stops 50 it is not necessary to use a wrench or other means to hold bolts 43 against rotation when tightening nuts 44. Tightening of nuts 44 results in compression of the side bar gaskets 52 into sealing relationship between the faces of the side bars of the two sleeve segments. After the side bars have been drawn together in this manner, the diver then tightens the bolts 60 to effect compression of the end-wall gaskets 55, and the installation is complete. The rope 73 is then removed and the diver moves on to the next point of installation.

Advantageously, the side bar bolts are constructed, in accordance with the invention, in such manner that the lowering lines are securely attached to the bolts while permitting the nuts for the bolts to be lowered via the lines into threaded engagement with the bolts without prior removal of the lines from the bolts. In this construction, the work of the diver who is making the assembly is greatly simplified and maximum speed is realized.

Bolts embodying this feature of the invention are shown in Figs. 9 to 15. Referring more particularly to Fig. 9, wherein parts corresponding with those shown in Figs. 1 to 8 have been given the same reference numerals to which 100 has been added, there is shown a side-bar bolt 143 which is constructed to receive and firmly hold lowering line 168. Bolt 143 is tapped to provide it with an axial, internally threaded aperture 180. Received in the aperture 180 is the threaded end 181 of a connector 182, which has a socket 183 into which the free end of cable 168 is sweated. Cable 168 is thus removably secured to bolt 143 by screwing connector 182 into the aperture 180. It will also be observed that the body of connector 182 lies wholly within the periphery of bolt 143 and is of a conically tapered shape to center and guide a nut 144, lowered via cable 168, onto the threads of the bolt. After the nut 144 has been lowered into place and tightened upon bolt 143 to connect the sleeve segments, cable 168 is readily removed by unscrewing connector 182, or if desired, cable 168 may be cut adjacent the connector.

Another bolt construction in accordance with the invention is shown in Fig. 10, wherein parts corresponding to those shown in Figs. 1 to 8 have been given the same reference numerals to which 200 have been added. As shown in Fig. 10, bolt 243 is formed with an axial aperture 280 which extends the entire length of the bolt and is of sufficient diameter to receive the lowering line 268 freely. Line 268 is held in place by knotting its free end or by other like convenient means. To guide and center the nut 244 upon bolt 243, an axially-apertured guide member 282 is seated at the end of bolt 243. Like the body portion of connector 182 of Fig. 9, guide members 282 have a tapered surface which automatically directs the nut 244 into engagement with the threads of the bolt. The arrangement shown in Fig. 10 is particularly suitable for use when the lowering lines employed are ropes, although it may also be used with metal lowering lines, such as wires or cables.

In Fig. 11 is shown another bolt arrangement which is suitable for use with rope or metal lowering lines. As shown in Fig. 11, wherein parts corresponding to those shown in Figs. 1 to 8 are given the same reference numerals to which 300 has been added, side-bar bolt 343 is formed with an axial internally threaded aperture 380 in which is threadedly received the threaded end 381 of a connector 382, which is in the form of an eye-bolt. The lowering line 368, whether rope, wire or cable, is secured in the eye 383 of connector 382 and the line may, after use, be removed from side-bar bolt 343 either by unscrewing connector 382 or by cutting or otherwise separating line 368 from the connector. When in position, as shown in Fig. 11, connector 382 guides the nut 344 into engagement with the threads of side-bar bolt 343.

Figs. 12 through 15 show two embodiments of the bolts of the invention which are constructed to provide integral eyes for receiving the free ends of the lowering lines. Referring to Figs. 12 and 13, for example, wherein parts corresponding to those shown in Figs. 1 to 8 have been given the same reference numerals to which 400 has been added, side-bar bolt 443 has its end formed with an axial extension 482 having an eye 483. The lowering line is passed through eye 483 in substantially the same manner as shown in Fig. 11.

Figs. 14 and 15 show a similar construction in which the axial extension is of somewhat modified form to facilitate the alignment of the nut on the bolt. In Figs. 14 and 15, wherein corresponding reference numerals are prefixed by 500, bolt 543 has an extension 582 which has a curved periphery and is defined by cutting away opposite sides of the end of the bolt, as indicated at 585. Extension 582 is provided with an aperture or eye 583 for receiving the free end of the lowering line, as in Figs. 12 and 13. When the nut, which is guided downwardly on the lowering line, engages extension 482 it is automatically centered and aligned on bolt 543 and assembly of the sleeve is thereby facilitated.

While certain preferred embodiments have been illustrated and described in detail, it will be obvious that these embodiments may be modified in various ways without departing from the spirit and scope of the present invention. For example, although it is preferred to use the connector 182 as shown in Fig. 9, this unit could, if desired, be omitted and the cable or wire 168 secured, as by welding or other convenient means, directly in aperture 180. In this type of construction it would be necessary to cut the line 168 to free the bolt.

Similarly, it will be apparent to those skilled in the art that various other changes and modifications may be made in the embodiments described and illustrated without departing from the scope of the invention as defined in the appended claims, and it is intended, therefore, that all matter contained in the foregoing description and in the accompanying drawings shall be interpreted as illustrative only and not in a limiting sense.

What I claim and desire to secure by Letters Patent is:

1. A method of coupling submerged sections of a pipe line in fluid-tight aligned position with a pipe coupling of the type comprising a sleeve formed from two cooperating semi-cylindrical sleeve segments which comprises, attaching lowering lines to bolts on each side of one of said segments, lowering said segment to the submerged pipe sections by means of lines on one side of the segment while allowing the lines on the lower side of the segment to fall freely with the segment, drawing the lines on the lower side under the pipe sections and returning these lines to the surface, threading the second sleeve segment on the lines on both sides of the first segment, lowering the second segment to the submerged first segment while holding the lines taut, and securing the second segment to the first segment to form the sleeve enclosing portions of the ends of the pipe sections.

2. A method of coupling submerged sections of a pipe line in fluid-tight aligned position with a pipe coupling of the type comprising a sleeve formed from two cooperating semi-cylindrical sleeve segments which comprises, removably attaching lowering lines to bolts on each side of one of said segments, lowering said segment to the submerged pipe sections by means of the lines on one side of the segment while allowing the lines on the lower side of the segment to fall freely with the segment, drawing the lines on the lower side under the pipe sections and returning these lines to the surface, threading the second sleeve segment on the lines on both sides of the first segment, lowering the second segment to the submerged first segment while holding the lines taut, lowering nuts for said bolts on said lines, securing the second segment to the first segment by means of said bolts and said nuts to form the sleeve enclosing portions of the ends of the pipe sections, and removing the lines.

3. A method of coupling submerged sections of a pipe line in fluid-tight aligned position with a pipe coupling of the type comprising a sleeve formed from two cooperating semi-cylindrical sleeve segments having apertured flanges on their longitudinal edges which comprises, attaching lowering lines to bolts on each side of one of said segments, lowering said segment to the submerged pipe sections by means of the lines on one side of the segment while allowing the lines of the lower side of the segment to fall freely with the segment, drawing the lines on the lower side under the pipe sections and returning these lines to the surface, threading the apertured flanges of the second sleeve segment on the lines on both sides of the first segment, lowering the second segment to the submerged first segment while holding the lines taut, and securing the second segment to the first segment to form the sleeve enclosing portions of the ends of the pipe sections.

4. A method of coupling submerged sections of a pipe line in fluid-tight aligned position with a pipe coupling of the type comprising a sleeve formed from two cooperating semi-cylindrical sleeve segments having apertured flanges on their longitudinal edges which comprises, removably attaching lowering lines to bolts on each side of one of said segments, lowering said segment to the submerged pipe sections by means of the lines on one side of the segment while allowing the lines on the lower side of the segment to fall freely with the segment, drawing the lines on the lower side under the pipe sections and returning these lines to the surface, threading the apertured flanges of the second sleeve segment on the lines on both sides of the first segment, lowering the second segment to the submerged first segment while holding the lines taut, lowering nuts for said bolts on said lines, securing the second segment to the first segment by means of said bolts and said nuts, to form the sleeve enclosing portions of the ends of the pipe sections, and removing the lines.

5. A method of repairing a damaged portion of a submerged pipe line to provide a fluid-tight enclosure therefor with a pipe repair device of the type comprising a sleeve formed from two cooperating semi-cylindrical sleeve segments, which comprises attaching lowering lines to bolts on each side of one of said segments, lowering said segment to the submerged pipe by means of lines on one side of the segment while allowing the lines on the lower side of the segment to fall freely with the segment, drawing the lines on the lower side under the pipe line and returning these lines to the surface, threading the second sleeve segment on the lines on both sides of the first segment, lowering the second sleeve segment to the submerged first segment while holding the lines taut, and securing the second segment to the first segment to form the sleeve enclosing the damaged portion of the pipe line.

6. A method of repairing a damaged portion of a submerged section of a pipe line to provide a fluid-tight enclosure therefor with a pipe repair device of the type comprising a sleeve formed from two cooperating semi-cylindrical sleeve segments, which comprises removably attaching lowering lines to bolts on each side of one of said segments, lowering said segment to the submerged pipe by means of lines on one side of the segment while allowing the lines on the lower side of the segment to fall freely with the segment, drawing the lines on the lower side under the pipe line and returning these lines to the surface, threading the second sleeve segment on the lines on both sides of the first segment, lowering the second sleeve segment to the submerged first segment while holding the lines taut, lowering nuts for said bolts on said lines, securing the second segment to the first segment by means of said bolts and said nuts to form the sleeve enclosing the damaged portion of the pipe line, and removing the lines.

References Cited in the file of this patent

UNITED STATES PATENTS

| Number | Name | Date |
| --- | --- | --- |
| 732,400 | Dresser | June 30, 1903 |
| 1,051,086 | Clark | Jan. 21, 1913 |
| 1,940,729 | Pfefferle | Dec. 26, 1933 |
| 2,163,261 | Norton | June 20, 1939 |
| 2,266,593 | Emmons | Dec. 16, 1941 |
| 2,463,235 | Andrews | Mar. 1, 1949 |
| 2,565,807 | French | Aug. 28, 1951 |
| 2,685,129 | Meyers | Aug. 3, 1954 |
| 2,690,193 | Smith | Sept. 28, 1954 |